(12) United States Patent
Wise

(10) Patent No.: US 9,112,578 B2
(45) Date of Patent: Aug. 18, 2015

(54) DATA ARCHIVE FROM ISOLATED LOCATIONS

(71) Applicant: MTN Satellite Communications, Seattle, WA (US)

(72) Inventor: Robert M Wise, Issaquah, WA (US)

(73) Assignee: Maritime Telecommunications Network, Inc., Miramar, FL (US)

( * ) Notice: Subject to any disclaimer, the term of this patent is extended or adjusted under 35 U.S.C. 154(b) by 0 days.

(21) Appl. No.: 14/152,990

(22) Filed: Jan. 10, 2014

(65) Prior Publication Data

US 2014/0192708 A1    Jul. 10, 2014

Related U.S. Application Data

(60) Provisional application No. 61/750,947, filed on Jan. 10, 2013.

(51) Int. Cl.
*H04B 7/185* (2006.01)

(52) U.S. Cl.
CPC .................. *H04B 7/18513* (2013.01)

(58) Field of Classification Search
CPC ................. H04W 4/00; H04B 7/185
USPC ........... 370/252–253, 328–339; 455/509–513
See application file for complete search history.

(56) References Cited

U.S. PATENT DOCUMENTS

| | | | |
|---|---|---|---|
| 8,576,784 B2 * | 11/2013 | Lohr et al. | 370/329 |
| 2004/0136355 A1 * | 7/2004 | Mori et al. | 370/349 |
| 2007/0153716 A1 * | 7/2007 | Fukuzawa et al. | 370/315 |
| 2007/0244643 A1 * | 10/2007 | Tengler et al. | 701/301 |

* cited by examiner

*Primary Examiner* — Iqbal Zaidi
(74) *Attorney, Agent, or Firm* — FSP LLC

(57) ABSTRACT

A process of transferring data files between a source machine system and a destination machine system includes assigning a transfer time deadline to the data files. As the time deadline approaches or is reached, checking a vehicle route schedule to determine if the data files can be transferred to a vehicle that will be within wireless communication range of the source machine system before the transfer time deadline and which will traverse a route that will bring the vehicle within wireless communication range of the destination machine or an intermediate store and forward relay station. If the data files can be transferred to the vehicle that will be within wireless communication range of the source machine system before the transfer time deadline and which will traverse a route that will bring the vehicle within wireless communication range of the destination machine or an intermediate store and forward relay station, transferring the files to the vehicle. Otherwise, allocating a high priority channel on a satellite uplink for transfer of the files.

12 Claims, 5 Drawing Sheets

DATA ARCHIVE FROM ISOLATED LOCATIONS

CROSS REFERENCE TO RELATED APPLICATIONS

This application claims priority under 35 U.S.C. 119 to US provisional application No. 61/750,947, filed on Jan. 10, 2013, which is incorporated herein by reference in its entirety.

BACKGROUND

Isolated locales such as oil rig platforms may be subject to low bandwidth connections to data networks, which may inhibit certain types of communication with the world at large. For example, oil rigs may utilize satellite connections to reach the Internet or corporate networks (intranets). Satellite connections may have lower bandwidth than other network access technologies such as cable modem, fiber optics, or digital subscriber line (DSL). Satellite connections may also suffer slow-downs or outages due to weather conditions. This may inhibit certain types of communication from the remote locale, such as backing up large data files collected from sensors at the locale.

BRIEF DESCRIPTION OF THE DRAWINGS

In the drawings, the same reference numbers and acronyms identify elements or acts with the same or similar functionality for ease of understanding and convenience. To easily identify the discussion of any particular element or act, the most significant digit or digits in a reference number refer to the figure number in which that element is first introduced.

DETAILED DESCRIPTION

Preliminaries

Figure 1:
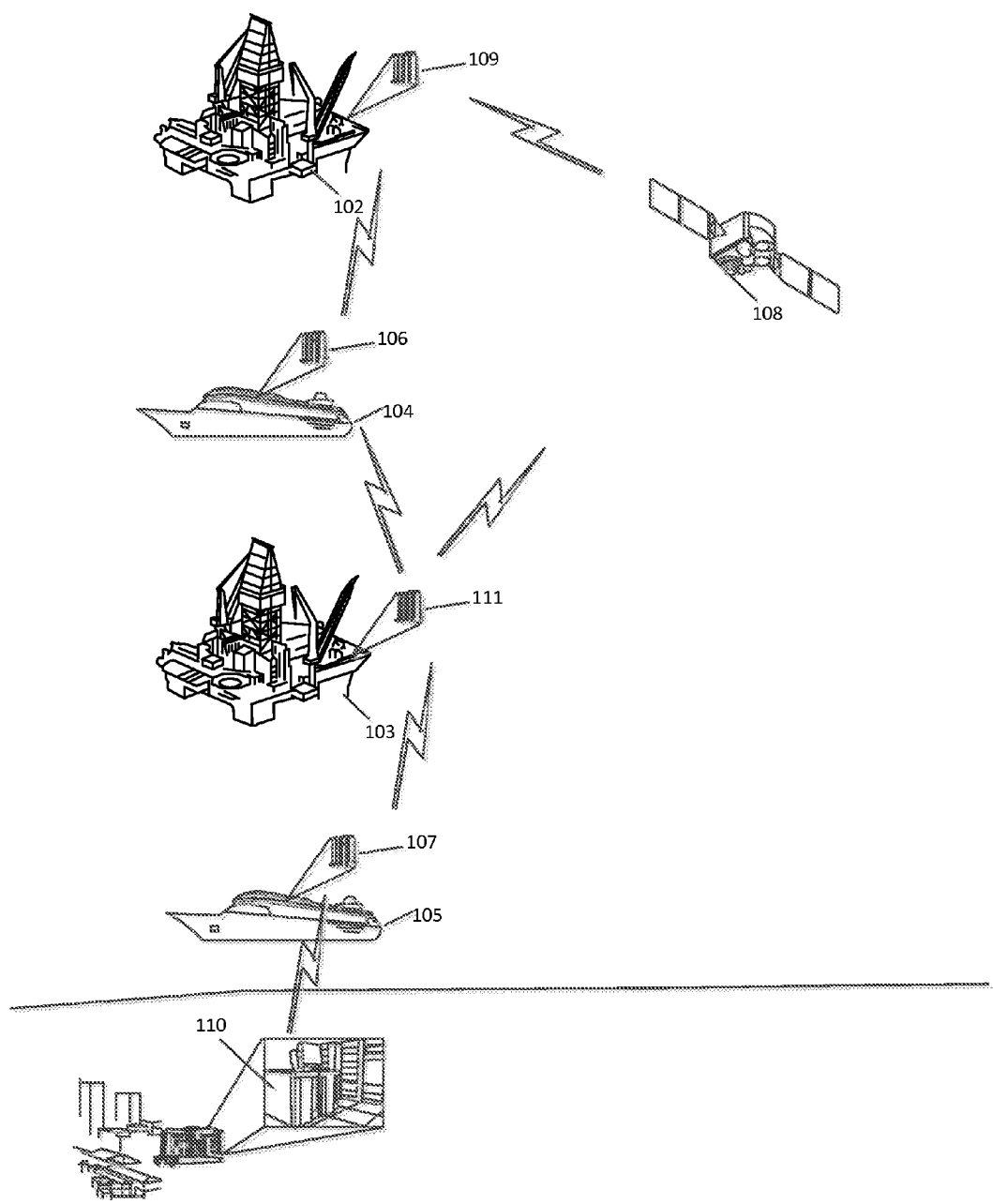
FIG. 1 illustrates an environment in which aspects of the described invention(s) may be utilized.

References to "one embodiment" or "an embodiment" do not necessarily refer to the same embodiment, although they may. Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively, unless expressly limited to a single one or multiple ones. Additionally, the words "herein," "above," "below" and words of similar import, when used in this application, refer to this application as a whole and not to any particular portions of this application. When the claims use the word "or" in reference to a list of two or more items, that word covers all of the following interpretations of the word: any of the items in the list, all of the items in the list and any combination of the items in the list, unless expressly limited to one or the other.

"Logic" refers to machine memory circuits, machine readable media, and/or circuitry which by way of its material and/or material-energy configuration comprises control and/or procedural signals, and/or settings and values (such as resistance, impedance, capacitance, inductance, current/voltage ratings, etc.), that may be applied to influence the operation of a device. Magnetic media, electronic circuits, electrical and optical memory (both volatile and nonvolatile), and firmware are examples of logic.

Those skilled in the art will appreciate that logic may be distributed throughout one or more devices, and/or may be comprised of combinations memory, media, processing circuits and controllers, other circuits, and so on. Therefore, in the interest of clarity and correctness logic may not always be distinctly illustrated in drawings of devices and systems, although it is inherently present therein.

The techniques and procedures described herein may be implemented via logic distributed in one or more computing devices. The particular distribution and choice of logic is a design decision that will vary according to implementation.

Overview

A process of transferring data files between a source machine system and a destination machine system includes assigning a transfer time deadline to the data files. As the time deadline approaches or is reached, checking a vehicle route schedule to determine if the data files can be transferred to a vehicle that will be within wireless communication range of the source machine system before the transfer time deadline and which will traverse a route that will bring the vehicle within wireless communication range of the destination machine or an intermediate store and forward relay station. If the data files can be transferred to the vehicle that will be within wireless communication range of the source machine system before the transfer time deadline and which will traverse a route that will bring the vehicle within wireless communication range of the destination machine or an intermediate store and forward relay station, transferring the files to the vehicle. Otherwise, allocating a high priority channel on a satellite uplink for transfer of the files.

---

(ship) in this context refers to a vessel that moves on or under the water. Although discussed in the context of a ship, the invention is applicable to other vehicles such as trains, busses, or planes.
(antenna) in this context refers to a physical device that facilitates the transmission and reception of radio waves. The size and shape of the antenna is designed according to the frequency and possibly other characteristics of radio waves or signal being communicated. Antennas are used in systems such as radio and television broadcasting, point-to-point radio communication, wireless LAN, mobile phones, radar, and satellite communication. The size and shape of an antenna is carefully designed and tuned to the characteristics of radio wave being transmitted and received.
(wireless) in this context refers to the transmission and/or reception of signals "without wires", i.e. communication without any wireline connections between the sender and the receiver. Wireless communications involves using the radio frequency spectrum (airwaves) and electromagnetic signaling logic to transmit information.
(store and forward) in this context refers to a telecommunications technique in which information is transmitted to an intermediate station where it is stored and transmitted at a later time to the final destination or to another intermediate station. The intermediate station, or node in a networking context, may verify the integrity of the message before forwarding it. This technique may be used in networks with intermittent connectivity, especially in isolated environments or those requiring high mobility. It may also be useful in applications when there are long delays in transmission and variable and high error rates, or if a direct, end-to-end connection is not available.

(relay) in this context refers to an electronic device that receives a signal and retransmits it at a higher level or higher power, or onto the other side of an obstruction, so that the signal can cover longer distances.

(uplink) in this context refers to signaling going in the direction from a device (such as a computer or phone) to a network, server, or satellite. A two-way (bi-directional) connection generally contains both an uplink and downlink connection. In the context of satellite communications, an uplink is the earth-to-satellite microwave link and related components such as earth station transmitting equipment. The satellite contains an uplink receiver. Various uplink components in the earth station are involved with the processing and transmission of the signal to the satellite.

(file) in this context refers to an organization of machine memory including physical partitioning bounding the file contents and distinguishing the file contents from the contents of other areas of the memory, including other files. The file typically configures the machine memory so that an operating system or BIOS can access the file contents using an identifier, which is often a human-readable sequence of symbols (the file name)

(timer) in this context refers to logic that measures elapsed time or a time interval (WAP) in this context refers to (wireless access point) a device that makes a wireless interface to a network available to client devices. Examples of wireless network access points are WiFi "hotspots" and 3G and 4G cellular hotspots a wireless access point, a device or system including radio transceivers that convert digital information to and from radio signals that can be exchanged with other wireless communication devices. The most basic forms of wireless access points simply for wireless connections. A wireless access point that includes the ability of DHCP and network address translation (NAT) is typically called a wireless gateway.

(bandwidth) in this context refers to Bandwidth is used to measure the data throughput of a channel or connection. It's the amount of data that can be sent over a connection in a given amount of time without distortion. It should not be confused with band. The width or capacity of a communications channel. Analog bandwidth is measured in Hertz (Hz) or cycles per second. The actual bandwidth size is the difference between the lowest and highest frequency in the band, which determines how much information can be transmitted at once. Digital bandwidth is the amount or volume of data that may be sent through a channel, measured in bits per second, without distortion. Bandwidth should not be confused with the term band, such as a wireless phone that operates on the 800 MHz band. Bandwidth is the space it occupies on that band. The relative importance of bandwidth in wireless communications is that the size, or bandwidth, of a channel will impact transmission speed. Lots of data flowing through a narrow channel takes longer than the same amount of data flowing through a broader channel.

(internet) in this context refers to a global system of interconnected computer networks that use the standard Internet protocol suite (TCP/IP) to serve several billion users worldwide. It is a network of networks that consists of millions of private, public, academic, business, and government networks, of local to global scope, that are linked by a broad array of electronic, wireless and optical networking technologies. The Internet carries an extensive range of information resources and services, such as the inter-linked hypertext documents of the World Wide Web (WWW), the infrastructure to support email, and peer-to-peer networks.

(satellite) in this context refers to An object that revolves around another object of greater mass (such as the earth) and has a motion that is determined by the force of attraction (gravity) of the larger object. (2-communications) A space vehicle that orbits the earth which contains one or more radio transponders that receive and retransmit signals to and from the earth. (3-equipment) A piece of equipment or system that operates at a remote location from a central control system.

(platform) refers to a data facility remotely located and lacking a high speed wired interface to a WAN.

(application server) in this context refers to logic that provides resources to execute applications and makes features of those applications available to client devices over a network communication channel.

(application) in this context refers to Also, logic that causes a computer to perform tasks beyond the basic operation of the computer itself. The term "application" may be abbreviated in some contexts to simply "app". An application may be logic built upon or integrated with operating system logic. Examples of application logic include enterprise software, accounting software, office suites, graphics software, games, web browsers, and media players. Applications may be bundled with the computer and its system software or published separately. Application logic applies the capabilities of a particular computing platform or system software to a particular purpose. Some applications are available in versions for several different platforms; others have narrower requirements and are thus called, for example, a Geography application for Windows or an Android application for education or Linux gaming. (Operating system (logic)) in this context refers to (ASIC) in this context refers to Application-specific integrated circuit (audio) in this context refers to a representation of sound within a device or a physical storage or communication media, typically as either analog or digital signals (BIOS) in this context refers to (Basic Input/Output System), also known as System BIOS, ROM BIOS or PC BIOS is a definition of an interface to input and output devices of a machine. The BIOS are typically initializes and tests the machine I/O components, and loads a bootloader or an operating system from a mass memory device. The BIOS additionally provides abstraction layer for the hardware, i.e. a consistent way for application programs and operating systems to interact with the keyboard, display, and other input/output devices. Variations in the system hardware are hidden by the BIOS from programs that use BIOS services instead of directly accessing the hardware. Many operating systems ignore the abstraction layer provided by the BIOS and access the hardware components directly. The Unified Extensible Firmware Interface (UEFI) is a specification that defines a software interface between an operating system and platform firmware. UEFI is meant to replace the Basic Input/Output System (BIOS) firmware interface.

(bridge) in this context refers to logic to enable two or more communication networks, or two or more network segments, to create an aggregate network. Bridging is distinct from routing which allows the networks to communicate independently as separate networks. A network bridge is a network device that connects multiple network segments.

(browser) in this context refers to logic that is operated by a device to access content and logic provided by Internet sites over a machine network. Browser logic provides a human-friendly interface to locate, access, utilize, and display content and logic encoded by web sites or otherwise available from servers of a network (such as the Internet).

(bus) in this context refers to a collection of coordinated conductors through which data is transmitted from one part of a device to another. You can think of a bus as a highway on which data travels within a computer. The term bus may refer to an internal bus, a bus that connects all the internal computer components to the CPU and main memory. There's also an expansion bus that enables expansion boards to access the CPU and memory. Types of internal busses are the address bus and the data bus. The data bus transfers actual data whereas the address bus transfers information about where the data is located in machine memory. There are also external busses such as USB and Firewire. The size of a bus, known as its width, is important because it determines how much data can be transmitted at one time. For example, a 16-bit bus can transmit 16 bits of data, whereas a 32-bit bus can transmit 32 bits of data. Every bus has a clock speed. A fast bus allows data to be transferred faster, which makes applications run faster.

(cellular network) in this context refers to (mobile network) logic implementing a radio network distributed over land areas called cells, each served by at least one fixed-location transceiver, known as a cell site or base station. In a cellular network, each cell uses a different set of frequencies from neighboring cells, to avoid interference and provide guaranteed bandwidth within each cell. When joined together these cells provide radio coverage over a wide geographic area. This enables a large number of portable transceivers (e.g., mobile phones, pagers, etc.) to communicate with each other and with fixed transceivers and telephones anywhere in the network, via base stations, even if some of the transceivers are moving through more than one cell during transmission.

(client device) in this context refers to any machine that interfaces to a machine network to obtain resources from one or more server systems.

(communication address) in this context refers to a machine code that may be applied to affect machine network routing logic to communicate signals from one machine to another across the network.

(CPU) in this context refers to (Central Processing Unit), an electronic circuit that operates as a main and general purpose execution component for device logic.

(database server) in this context refers to one or more server machines that provide storage and access (queries against) database(s) on behalf of client devices.

(database) in this context refers to an organized collection of data (states of matter representing values, symbols, or control signals to device logic), structured typically into tables that comprise 'rows' and 'columns', although this structure is not implemented in every case. One column of a table is often designated a 'key' for purposes of creating indexes to rapidly search the database.

(display) in this context refers to A output device for visual information. Display technologies, esp. for mobile devices, may include CSTN, TFT, TFD or OLED. There are also types of touchscreen displays, e.g. capacitive and resistive.

(DSP) in this context refers to (Digital Signal Processor)

(email) in this context refers to a form of electronic or optical communications between devices, which takes the form of exchanging messages from an author to one or more recipients. Email communications typically operates across the Internet or other device networks (FPGA) in this context refers to field programmable gate array (gateway) in this context refers to a network device that serves as an interface to another network. Within enterprises, the gateway routes traffic from an internal network (e.g., LAN) to a wide area network such as the Internet. In homes, the gateway may be provided by the ISP that connects the home to the Internet. In enterprises, the gateway node often acts as a proxy server and a firewall.

(hard disk) in this context refers to hard drive.

(HTML) in this context refers to HyperText Markup Language, a standard markup language used to define web pages on the Internet for viewing and interaction with web browsers (IP) in this context refers to (Internet Protocol) a primary protocol in the Internet protocol suite designed to enable delivery of data packets from a source device to a destination device based on an address (i.e., an IP address). IP defines datagram structures that encapsulate the data to be delivered. It also defines addressing mechanisms to identify the datagram source and destination devices. IP is the the protocol used for communicating data across a packet-switched network used in most publicly accessible networks today. Connections that mobile devices make to GPRS, 3G and similar networks are made using IP.

-continued (keypad) in this context refers to a device including an arrangement of buttons or keys, to act as switches each associated with a symbol. Pressing or activating a key inputs the associated character to an attached device.

(LAN) in this context refers to logic implementing a network that interconnects computers and devices in a defined area such as a home, school, computer laboratory, or office building. LANs, in contrast to wide area networks (WANs), include usually higher data-transfer rates, smaller geographic area, and lack of a need for leased telecommunication lines. Ethernet over twisted pair cabling, and Wi-Fi (Wireless LANs, or WLANs) are two common technologies currently used to build LANs.

(load balancing) in this context refers to a resource cluster and associated logic for distributing workloads across multiple components or communication links. Load balancing may attempt to optimize resource utilization in an even fashion, maximize throughput, minimize response time, and avoid overloads. Because it utilizes multiple components, load balancing may increase reliability through redundancy.

(media) in this context refers to objects on which data can be stored. These include hard disks, floppy disks, CD-ROMs, and tapes.(2) In computer networks, media refers to the cables linking workstations together. There are many different types of transmission media, the most popular being twisted-pair wire (normal electrical wire), coaxial cable (the type of cable used for cable television), and fiber optic cable (cables made out of glass). (3) The form and technology used to communicate information. Multimedia presentations, for example, combine sound, pictures, and videos, all of which are different types of media.

(memory) in this context refers to a device having a machine interface and storing data in the form of an altered material/energy configuration. Two common types of device memory are SAM, or Sequential Access Memory and RAM, or Random Access Memory. Data on SAM devices is read and written in a sequence, while data on a RAM device is read or written in any order. Examples of SAM devices include CD-ROMS and magnetic tape. RAM devices include flash drives and solid state hard drives. RAM is usually faster than SAM. Other examples of device memory are hard drives, flash drives, optical discs and RAM chips.

(mobile device) in this context refers to any device that includes logic to communicate over a machine network and having a form factor compatible with being carried conveniently by a single human operator. Mobile devices typically have wireless communications capability via WAPs or cellular networks.

(modem) in this context refers to (modulator-demodulator) a device that modulates a carrier signal to encode digital information, and also demodulates such a carrier signal to decode the transmitted information.

(OS) in this context refers to logic that manages device hardware resources and provides common services for application logic. The operating system is a component of many devices, such as computers and mobile phones. Application logic usually requires an operating system in order to function. Operating systems typically manage utilization of device resources, such as I/O devices, displays, processor utilization, memory, mass storage, and printing. The operating system acts as an intermediary between applications and the hardware resources, although applications are often (though not always, in the case of virtual machines) executed directly by the device hardware (e.g., one or more CPUs) and will frequently make system calls to the operating system, or be interrupted by it. Operating systems can be found on almost any device that contains a programmable processor or controller, from cellular phones and video game consoles to supercomputers and web servers.

(processor) in this context refers to any circuit or virtual circuit (a physical circuit emulated by logic executing on an actual processor) that manipulates data values according to control signals (e.g., 'commands', 'op codes', 'machine code', etc.) and which produces corresponding output signals that are applied to operate a machine.

(RAM) in this context refers to (Random-Access Memory) a type of memory that is fast relative to other (e.g., nonvolatile) memory is a device, but is volatile, meaning stored information is lost when electric power is removed. RAM is also typically freely addressable, meaning addressability is not constrained to block or sequential access. For these reasons, it is useful only for temporary storage of data that requires fast access. A device will typically have RAM and some kind non-volatile memory to store a copy of all logic (i.e., 'code' and 'data') that needs to be maintained when the device is powered off or that specific logic is not executing on the device. Both the OS and application software typically use RAM.

(RF) in this context refers to (radio frequency) a rate of oscillation in the range of about 3 kHz to 300 GHz, which corresponds to the frequency of electromagnetic radio waves, and the alternating currents which carry radio signals. RF usually refers to electrical rather than mechanical oscillations, although mechanical RF systems do exist Radio FrequencyRF can refer to anything related to radio signals, which are invisible electromagnetic waves created by applying a pulsing electric current to an antenna. "RF" generally refers to the radio waves themselves, or systems that handle radio signals directly, such as the circuits connected directly to the antenna. Technically, RF is the 10 kHz to 300 GHz frequency range of the electromagnetic spectrum that can be used for wireless communication known as radio.

(ROM) in this context refers to device memory containing data that normally can only be read, not written to. Unlike a computer's random access memory (RAM), the data in ROM is not lost when the computer power is turned off. The data on the ROM can usually be loaded into the RAM if needed. "Read-only memory" may in fact be writable memory, but the process of writing data is comparatively slow and infrequent as compared to RAM, and often does not permit the addressing flexibility that RAM does.

(router) in this context refers to logic that distributes digital information that is contained within a data packet. Each data packet contains address information that a router can use to -continued determine if the source and destination are on the same network, or if the data packet must
be transferred from one network to another. This transfer to another type of network is
achieved by encapsulating the data with network specific protocol header information.
When multiple routers are used in a large collection of interconnected networks, the routers
exchange information about target system addresses, so that each router can build up a table
showing the preferred paths between any two systems on the interconnected networks.
(sensor) in this context refers to a device or composition of matter that responds to a
physical stimulus (as heat, light, sound, pressure, magnetism, or a particular motion) and
transmits a resulting impulse (as for measurement or operating a control)
(server) in this context refers to logic designed to respond to requests for functionality from
client logic that interacts with the server logic via a request/response model, often over a
network. Thus, the server performs some operation utilizing the underlying resources of the
device or devices hosting the server, on behalf of clients (request submitters). The client
logic either executes on the same device or devices as the server logic, or interacts with the
server logic through a machine data network.
(WAN) in this context refers to (Wide Area Network) a network that provides data
communications to a larger number of users than are usually served by a local area network
(LAN) and is usually spread over a larger geographic area than that of a LAN. Logic
implementing a network that covers a broad area (e.g., a telecommunications network that
links across metropolitan, regional, or national boundaries) using private or public network
transports. Business and government entities utilize WANs to relay data among employees,
clients, buyers, and suppliers from various geographical locations. The Internet can be
considered a WAN.
(WAP) in this context refers to (wireless access point) a device that makes a wireless
interface to a network available to client devices. Examples of wireless network access
points are WiFi "hotspots" and 3G and 4G cellular. The most basic forms of wireless access
points simply for wireless connections. A wireless access point that includes the ability of
DHCP and network address translation (NAT) is typically called a wireless gateway.
(web server) in this context refers to a device or device system that delivers web pages in
response to requests for the web pages from web browsers. Also, logic to communicate web
pages at the request of clients, most typically using the Hypertext Transfer Protocol
(HTTP). The server communicates HTML documents and any additional content that may
be included by a document, such as images, style sheets and scripts, as well as content
referenced by certain types of links (pointers) in the web pages. A user agent, commonly a
web browser or web crawler, initiates communication with the web server by making a
request for a resource using (typically) HTTP, and the server responds with the content of
that resource or an error message if unable to do so. The resource is typically a file on the
server's secondary storage, but this is not necessarily the case. Many web servers have a
capability of receiving content from clients. This feature is used for submitting web forms,
including uploading of files.

Description

Figure 2:
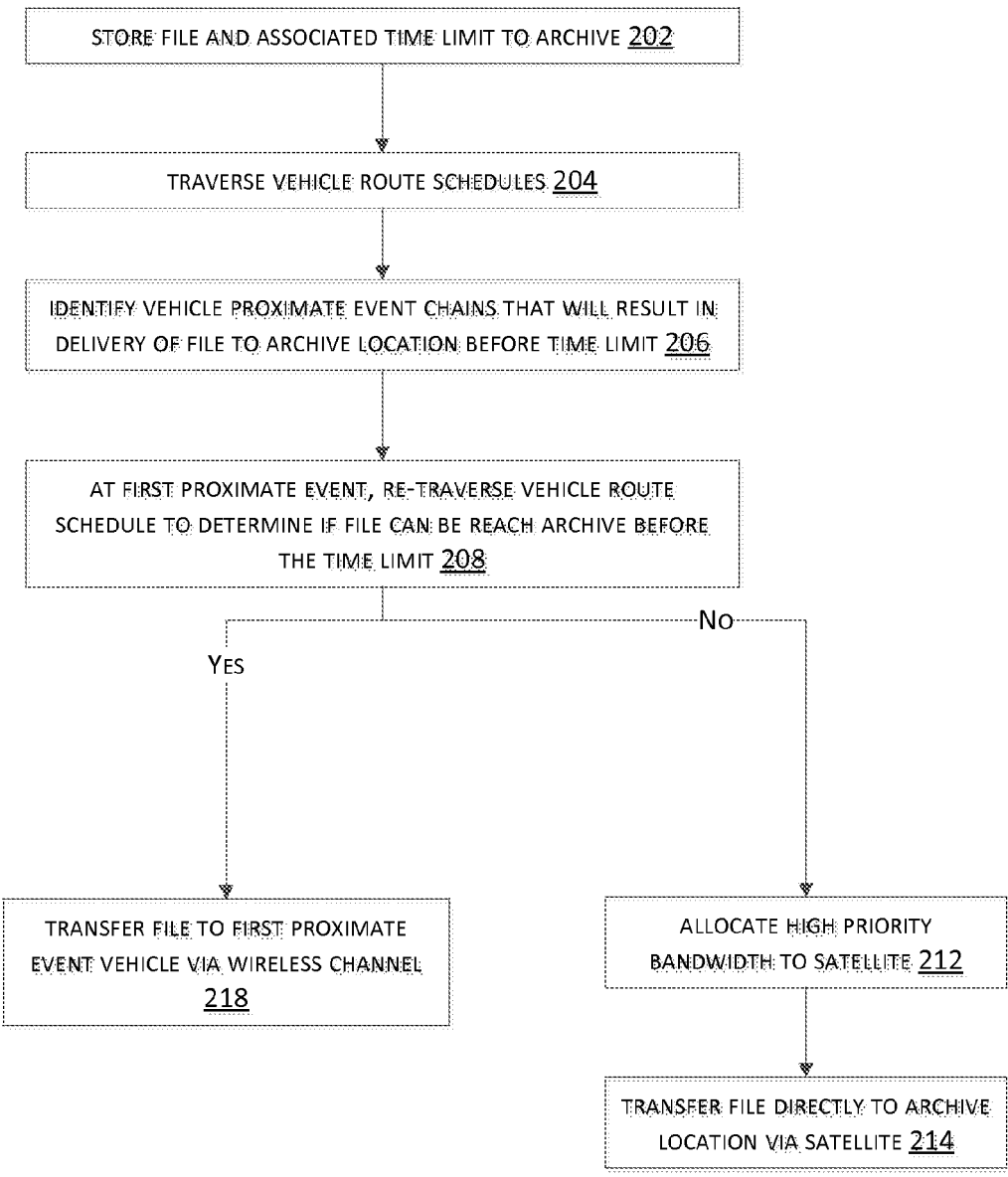
FIG. 2 illustrates an embodiment of a file transfer process.

FIG. 1 and FIG. 2 illustrate an environment and process for transferring files from remote locations. Although the following description speaks in terms of transferring the files to an "archive", the system and techniques described are not limited to file archiving. In fact, they are applicable to file transfers in general where the files have a delivery time requirement.

A ship 104 with a movable wireless antenna may be utilized as a store and forward relay between two fixed ocean platforms 102, 103. The ship 104 is positioned so that the movable antenna is aimed toward the first platform 102 in the ocean or sea. The first platform 102 has data network and storage system 109 coupled to an uplink to a satellite 108. Particular data files stored by the first platform's computer data system 109 are marked to be transferred to an archive facility 110 on shore (202). The files may be marked for transfer by a certain time (e.g., associated with a timestamp), and if that time approaches and/or passes and the files have not been or cannot be transferred to the archive facility 110 via a chain of moving vessels (e.g., a passing ship utilizing a directed wireless beam) and/or other platform-based systems, bandwidth to the satellite 108 may be reallocated on a priority basis (212) and utilized to perform the transfer (214) directly to the final destination (e.g., archive facility 110). Vehicle route schedules may be traversed (204) to identify vehicle proximate events forming a chain of transfer opportunities that will result in delivery of the files to the archive location before the time limit (206). If the time limit is approaching or at hand and the updated route schedules indicate the time limit will be exceeded, transfer via satellite may commence. At occurrence of a first proximate event (e.g., a first ship 104 coming within wireless communication range of the platform system 109), or at each proximate event in the required event chain, the route information may be re-traversed to determine if the file can reach the archive (i.e., final destination) before the time limit (208).

If the time limit for transfer of the file to the final destination can still be met upon the first proximate event in the chain of transfer, the file may be transferred to the first passing vehicle (e.g., ship) (218). Transferring the files to a passing ship 104 (218) may start a new timer running on the transfer of the critical files; or the original transfer clock may continue to run. If the files aren't transferred from the ship 104 to the archive location on shore within the transfer time limit, an uplink from the ship data system 106 to the satellite 108 may be utilized to transfer the files.

A reallocation of satellite bandwidth may take place to provide either the platform 102 or the ship 104 with more satellite bandwidth when critical files are coming due for transfer and they haven't yet been transferred to the archive facility 110.

In one embodiment, a ship 105 coming in to the range of a shore-side wireless access point of the archive facility 110 may utilize a directed WiFi channel via a moveable antenna to wirelessly transfer the files to the archive facility 110. Alternately, a ship 104 may communicate files from a first platform system 109 by directing its wireless antenna towards a second platform system 111 that is in wireless range of the ship 104 but not within wireless range of the first platform system 109.

The files transferred to the second platform system 111 may be communicated through a second ship 105 data system 107 to the archive facility 110, or directly to the archive facility 110 if the second platform system is within wireless communication range of the archive system 110. The original transfer time limit for the files may continue to run as the files are transferred from ship to platform to ship. If at any point in the time limit expires or approaches the limit, or if ship routing information indicates the limit will be exceeded due to delays or changes, the files may be transferred over a satellite connection. Satellite bandwidth may be reallocated to provide greater bandwidth to whatever platform (ship or rig) is performing the scheduled transfer at any point in the transfer chain from the source of the files to the archive facility 110.

One or more moving vessels (e.g., ships), fixed locations (e.g. oil rigs), and shore-side locations may include computer system and other logic to carry out the procedures described herein.

Figure 3:
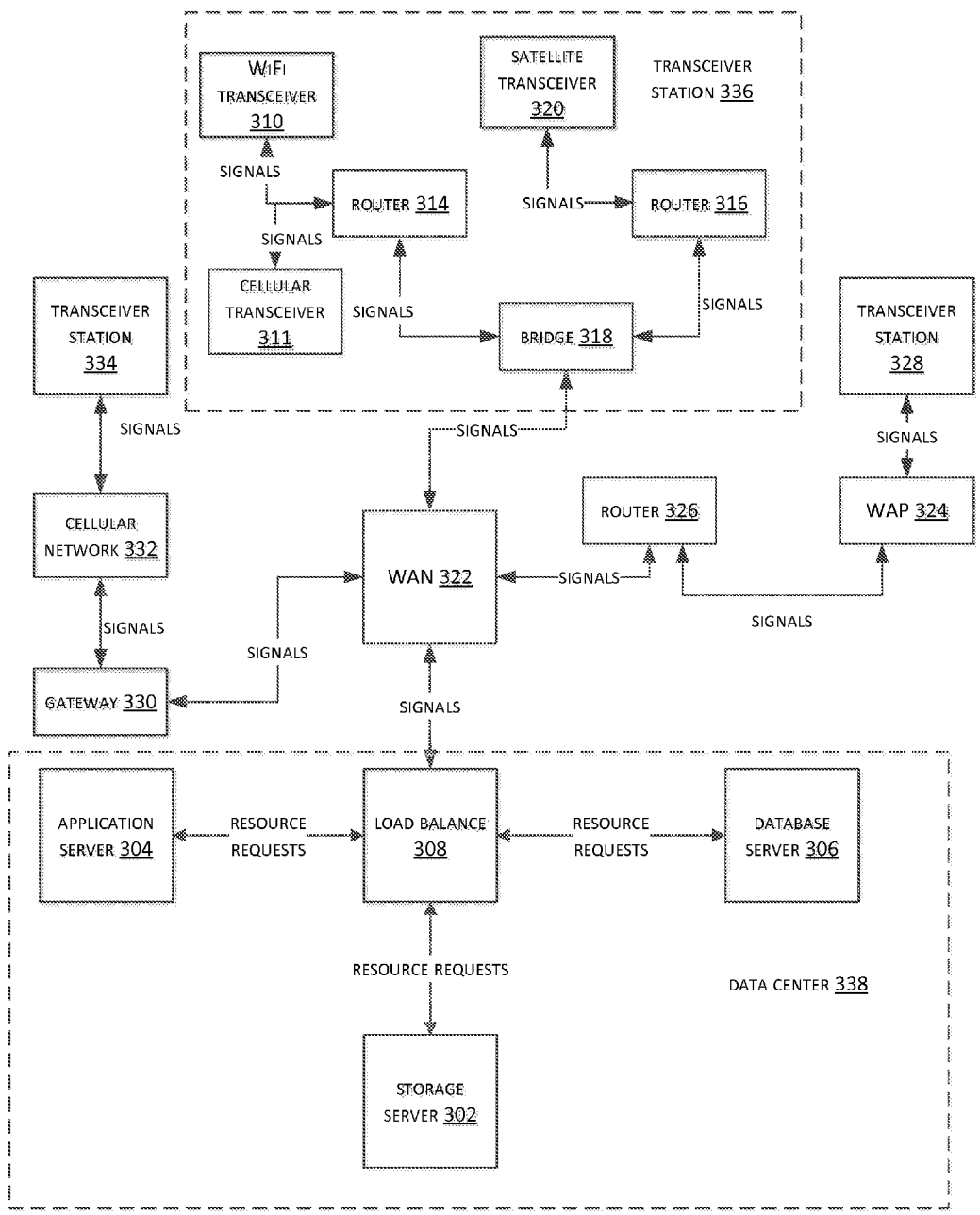
FIG. 3 illustrates a machine network for implementing a final or intermediate file destination (e.g., archive facility).

FIG. 3 illustrates an embodiment of a machine system that may function as a final or intermediate destination of a file transfer process as described herein. Transceiver stations 336, 328, and 334 may utilize one or more wireless network technologies to send and receive wireless signals, including cellular transceivers 311, WiFi transceivers 310, and satellite transceivers 320. The transceiver stations 336, 328, and 334 may interface to a WAN 322 (e.g., intranet or Internet) using various machine network technologies, such as a cellular network 332, cable modem, DSL, T1, or WAP 324. Signals representing server resource requests or data transfer (e.g., file transfer) are output from transceiver stations to the various WAN access devices, from which they are propagated to the WAN 322 and from there to a data center 338. These signals are typically encoded into standard protocols such as Internet Protocol (IP), TCP/IP, and HTTP. When the clients are part of a LAN 336, the signals may be propagated via one or more router 314 316 and a bridge 318. A router 326 may propagate signals from the WAP 324 to the WAN 322. A gateway 330 may propagate signals from the cellular network 332 to the WAN 322. The server system in this example comprises a number of separate server devices, typically each implemented in the separated machine, although this is not necessarily the case. The signals from various transceiver stations are provided via a load balancing server 308 to one or more application server 304 and one or more database server 316 and one or more storage server 302. Load balancing server 308 maintains an even load distribution to the other servers, including storage server 302, application server 304, and database server 306. These server devices may cooperate to implement a data archive, a file system, a web site or any machine network based resource or application. Each server in the drawing may represent in effect multiple servers of that type. The signals applied to the database server 306 may cause the database server 306 to access and certain memory addresses, which correlates to certain rows and columns in a memory device. The data center 338 may thus be implemented as devices coordinated on a LAN, or over a wide geographical area utilizing a WAN or cellular network, or over a limited area (room or house or store/bar) utilizing a WAP. A data archive may be implemented, for example, as an application (app) on a corporate LAN. The data center 338 and associated transceiver stations 336, 328, 334 may be implemented as a pure or hybrid peer to peer system in a local or widely distributed area.

Figure 4:
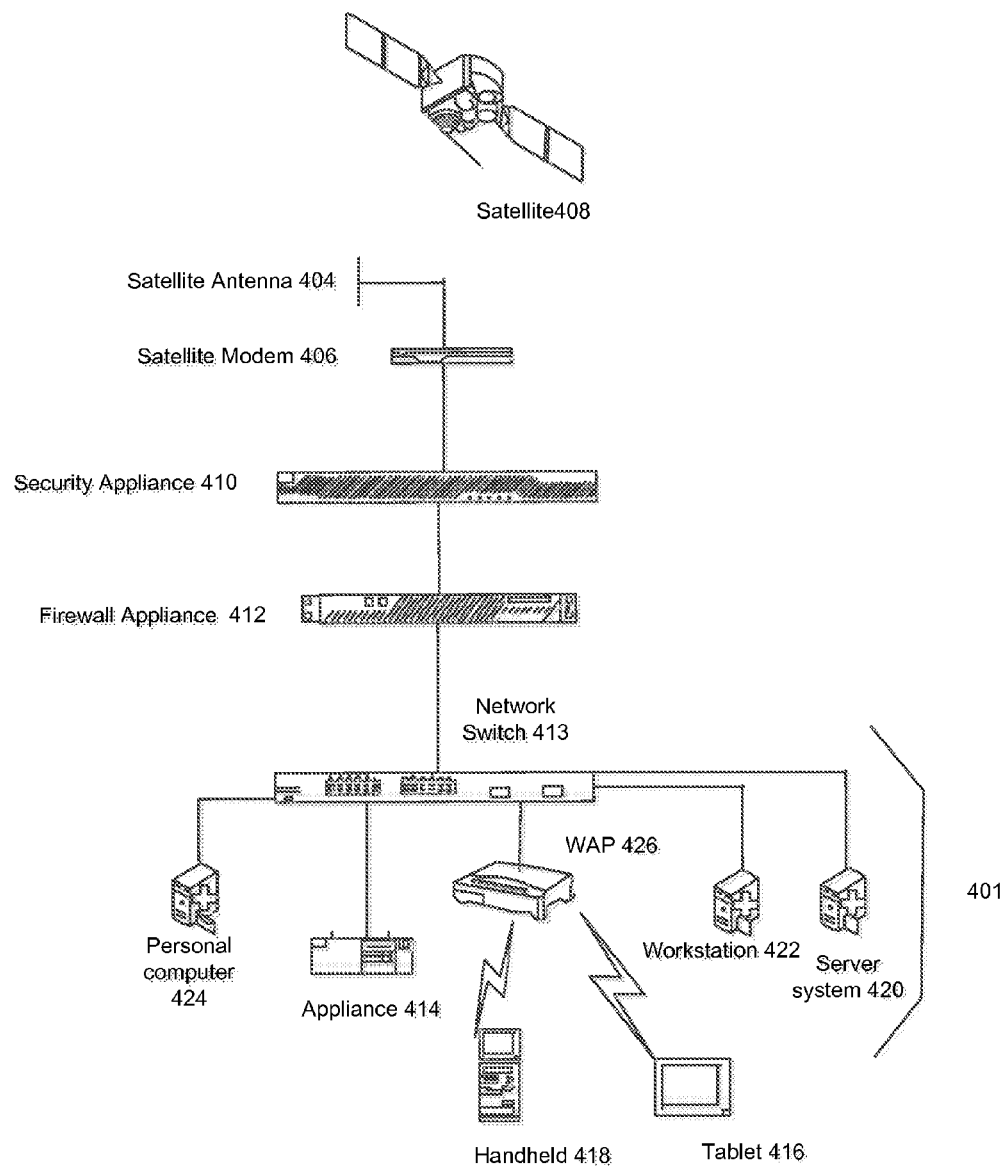
FIG. 4 illustrates a machine network for implementing a final or intermediate file destination (e.g., platform or ship).

FIG. 4 illustrates an embodiment of a machine internetworking system to implement a source, final destination, or intermediate destination of a file (e.g., on a platform or a ship). Communication is carried out between devices of a local area network (LAN) 401 and a wide area network (WAN) (e.g., the Internet) via a satellite antenna 404 and satellite 408. The LAN 401 includes server systems 420, personal computers 424, appliances 414, tablets 416, handheld (mobile) devices 418, and workstations 422. A WAP 426 provides wireless access to the LAN 401. Of course, a typical LAN includes other devices as well, such as printers, faxes, scanners, etc. The networks are bridged via a system of devices including (in this example) a satellite modem 406, a security appliance 410, a firewall appliance 412, and a network switch 418. The security appliance 410 (e.g., Cisco 5510) provides, for example, firewall and VPN (virtual private network) concentration, intrusion detection, and intrusion prevention. The firewall appliance 412 (e.g., Barracuda) provides, for example, anti-virus and anti-fishing protection for the LAN 401, and web, email, and file content filtering. Communication traffic is switched between the LAN 401 and the WAN by a network switch 418.

Figure 5:
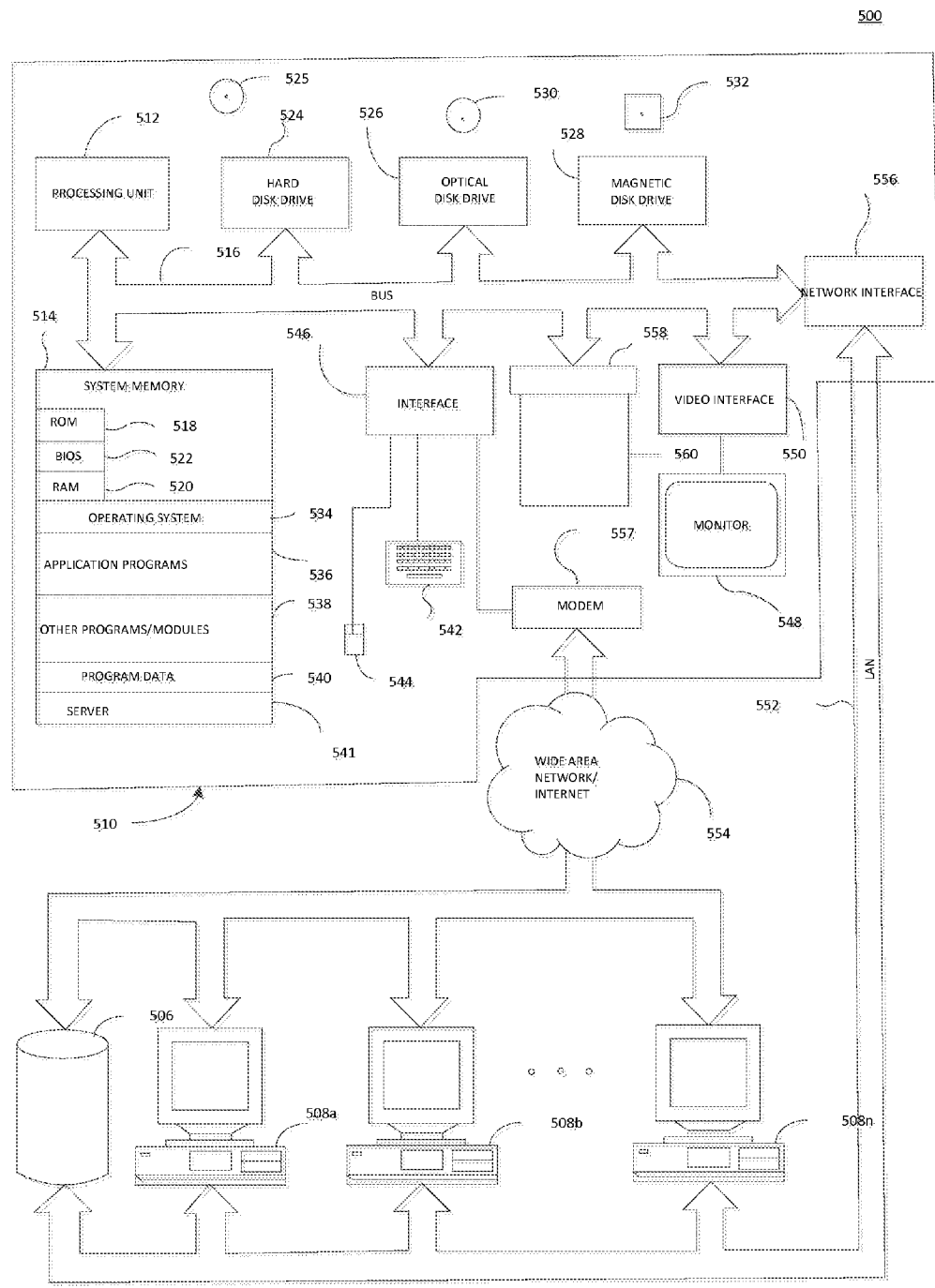
FIG. 5 illustrates a machine network and machine for implementing components of a machine network.

FIG. 5 illustrates an embodiment of a computer system machine and a machine communication network. The computer system 500 may implement, for instance, a storage server, server system, appliance, or workstation as described herein. A particular computer system 500 of the network may include one or more processing units 512$a$, 512$b$ (collectively 512), a system memory 514 and a system bus 516 that couples various system components including the system memory 514 to the processing units 512. The processing units 512 may be any logic processing unit, such as one or more central processing units (CPUs) 512$a$, digital signal processors (DSPs) 512$b$, application-specific integrated circuits (ASICs), field programmable gate arrays (FPGAs), etc. The system bus 516 can employ any known bus structures or architectures, including a memory bus with memory controller, a peripheral bus, and a local bus. The system memory 514 includes read-only memory (ROM) 518 and random access memory (RAM) 520. A basic input/output system (BIOS) 522, which can form part of the ROM 518, contains basic routines that help transfer information between elements within the computer system 500, such as during start-up.

The computer system 500 may also include a plurality of interfaces such as network interface 560, interface 550 supporting modem 562 or any other wireless/wired interfaces.

The computer system 500 may include a hard disk drive 524 for reading from and writing to a hard disk 526, an optical disk drive 528 for reading from and writing to removable optical disks 532, and/or a magnetic disk drive 530 for reading from and writing to magnetic disks 534. The optical disk 532 can be a CD-ROM, while the magnetic disk 534 can be a magnetic floppy disk or diskette. The hard disk drive 524, optical disk drive 528 and magnetic disk drive 530 may communicate with the processing unit 512 via the system bus 516. The hard disk drive 524, optical disk drive 528 and magnetic disk drive 530 may include interfaces or controllers (not shown) coupled between such drives and the system bus 516, as is known by those skilled in the relevant art. The drives 524, 528 and 230, and their associated computer-readable storage media 526, 532, 534, may provide non-volatile and non-transitory storage of computer readable instructions, data structures, program modules and other data for the computer system 500. Although the depicted computer system 500 is illustrated employing a hard disk 524, optical disk 528 and magnetic disk 530, those skilled in the relevant art will appreciate that other types of computer-readable storage media that can store data accessible by a computer may be employed, such as magnetic cassettes, flash memory, digital video disks (DVD), Bernoulli cartridges, RAMs, ROMs, smart cards, etc. For example, computer-readable storage media may include, but is not limited to, random access memory (RAM), read-only memory (ROM), electrically erasable programmable read-only memory (EEPROM), flash memory, compact disc ROM (CD-ROM), digital versatile disks (DVD) or other optical disk storage, magnetic cassettes, magnetic tape, magnetic disk storage or other magnetic storage devices, solid state memory or any other medium which can be used to store the desired information and which may be accessed by processing unit 512a.

Program modules can be stored in the system memory 514, such as an operating system 536, one or more application programs 538, other programs or modules 540 and program data 542. Application programs 538 may include instructions that cause the processor(s) 512 to automatically provide dynamic selection of data and telecommunication service providers before or during communications between various devices such as, for example, a mobile device and a landline telephone. Other program modules 540 may include instructions for handling security such as password or other access protection and communications encryption. The system memory 514 may also include communications programs, for example, a Web client or browser 544 for permitting the computer system 500 to access and exchange data with sources such as Web sites of the Internet, corporate intranets, extranets, or other networks and devices as described herein, as well as other server applications on server computing systems. The browser 544 in the depicted embodiment is markup language based, such as Hypertext Markup Language (HTML), Extensible Markup Language (XML) or Wireless Markup Language (WML), and operates with markup languages that use syntactically delimited characters added to the data of a document to represent the structure of the document. A number of Web clients or browsers are commercially available such as those from Mozilla, Google, and Microsoft.

Although illustrated as being stored in the system memory 514, the operating system 536, application programs 538, other programs/modules 540, program data 542 and browser 544 can be stored on the hard disk 526 of the hard disk drive 524, the optical disk 532 of the optical disk drive 528 and/or the magnetic disk 534 of the magnetic disk drive 530.

An operator can enter commands and information into the computer system 500 through input devices such as a touch screen or keyboard 546 and/or a pointing device such as a mouse 548, and/or via a graphical user interface. Other input devices can include a microphone, joystick, game pad, tablet, scanner, etc. These and other input devices are connected to one or more of the processing units 512 through an interface 550 such as a serial port interface that couples to the system bus 516, although other interfaces such as a parallel port, a game port or a wireless interface or a universal serial bus (USB) can be used. A monitor 552 or other display device is coupled to the system bus 516 via a video interface 254, such as a video adapter. The computer system 500 can include other output devices, such as speakers, printers, etc.

The computer system 500 can operate in a networked environment using logical connections to one or more remote computers and/or devices. For example, the computer system 500 can operate in a networked environment using logical connections to one or more mobile devices, landline telephones and other service providers or information servers. Communications may be via a wired and/or wireless network architecture, for instance wired and wireless enterprise-wide computer networks, intranets, extranets, telecommunications networks, cellular networks, paging networks, and other mobile networks.

Implementations and Alternatives

The techniques and procedures described herein may be implemented via logic distributed in one or more computing devices. The particular distribution and choice of logic is a design decision that will vary according to implementation.

Those having skill in the art will appreciate that there are various logic implementations by which processes and/or systems described herein can be effected (e.g., hardware, software, and/or firmware), and that the preferred vehicle will vary with the context in which the processes are deployed. "Software" refers to logic that may be readily readapted to different purposes (e.g. read/write volatile or nonvolatile memory or media). "Firmware" refers to logic embodied as read-only memories and/or media. Hardware refers to logic embodied as analog and/or digital circuits. If an implementer determines that speed and accuracy are paramount, the implementer may opt for a hardware and/or firmware vehicle; alternatively, if flexibility is paramount, the implementer may opt for a solely software implementation; or, yet again alternatively, the implementer may opt for some combination of hardware, software, and/or firmware. Hence, there are several possible vehicles by which the processes described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations may involve optically-oriented hardware, software, and or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood as notorious by those within the art that each function and/or operation within such block diagrams, flowcharts, or examples can be implemented, individually and/or collectively, by a wide range of hardware, software, firmware, or virtually any combination thereof. Several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in standard integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies equally regardless of the particular type of signal bearing media used to actually carry out the distribution.

Examples of a signal bearing media include, but are not limited to, the following: recordable type media such as floppy disks, hard disk drives, CD ROMs, digital tape, and computer memory.

In a general sense, those skilled in the art will recognize that the various aspects described herein which can be implemented, individually and/or collectively, by a wide range of hardware, software, firmware, or any combination thereof can be viewed as being composed of various types of "circuitry." Consequently, as used herein "circuitry" includes, but is not limited to, electrical circuitry having at least one discrete electrical circuit, electrical circuitry having at least one integrated circuit, electrical circuitry having at least one application specific integrated circuit, circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), circuitry forming a memory device (e.g., forms of random access memory), and/or circuitry forming a communications device (e.g., a modem, communications switch, or optical-electrical equipment).

Those skilled in the art will recognize that it is common within the art to describe devices and/or processes in the fashion set forth herein, and thereafter use standard engineering practices to integrate such described devices and/or processes into larger systems. That is, at least a portion of the devices and/or processes described herein can be integrated into a network processing system via a reasonable amount of experimentation.

The foregoing described aspects depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality.

What is claimed is:

1. A process of transferring data files between a source machine system and a destination machine system, comprising:
    assigning a transfer time deadline to the data files;
    as the time deadline approaches or is reached, checking a vehicle route schedule to determine if the data files can be transferred to a vehicle that will be within wireless communication range of the source machine system before the transfer time deadline and which will traverse a route that will bring the vehicle within wireless communication range of the destination machine or an intermediate store and forward relay station;
    if the data files can be transferred to the vehicle that will be within wireless communication range of the source machine system before the transfer time deadline and which will traverse the route that will bring the vehicle within wireless communication range of the destination machine or the intermediate store and forward relay station, transferring the files to the vehicle that will be within wireless communication range; and
    otherwise, allocating a high priority channel on a satellite uplink for transfer of the files.

2. The process of claim 1, further comprising:
    the intermediate store and forward relay station is a vehicle with a movable wireless antenna.

3. The process of claim 1, further comprising:
    the data files are stored on an ocean platform and are marked to be transferred to an archive facility at a shore-side location by the transfer time deadline.

4. The process of claim 1, further comprising:
    reallocating bandwidth to a satellite on a priority basis and utilizing the satellite to perform a transfer of the files directly to the destination machine.

5. The process of claim 1, further comprising:
    traversing route schedules of multiple vehicles in a fleet to identify vehicle proximate events forming a chain of transfer opportunities that will result in delivery of the files to the destination machine before the transfer time deadline.

6. The process of claim 1, further comprising:
    if the transfer time deadline is approaching or has arrived and updated route schedules indicate the transfer time deadline will be exceeded, transfer the files via satellite.

7. The process of claim 1, further comprising:
    upon occurrence of a first proximate event, or at each proximate event in a required event chain to transfer the files to the destination machine, re-traversing the vehicle route schedule to determine if the files will reach the destination machine before the transfer time deadline.

8. A process of transferring data files between a source machine system and a destination machine system, comprising:
    receiving the data files;
    comparing a transfer time deadline for the data files to a time signal from a clock;
    as the time deadline approaches or is reached, checking a vehicle route schedule to determine if the data files can be wirelessly transferred to a vehicle that will be within wireless communication range of the source machine system before the transfer time deadline and which will traverse a route that will bring the vehicle within wireless communication range of the destination machine or an intermediate store and forward relay station;
    if the data files can be transferred to the vehicle that will be within wireless communication range of the source machine system before the transfer time deadline and which will traverse the route that will bring the vehicle within wireless communication range of the destination machine or the intermediate store and forward relay station, transferring the files to the vehicle; and
    otherwise, allocating a high priority channel on a satellite uplink for transfer of the files.

9. The process of claim 8 further comprising:
    reallocating the high priority channel on the satellite uplink on a priority basis and utilizing the satellite uplink to perform a transfer of the files directly to the destination machine.

10. The process of claim 8 further comprising:
    traversing route schedules of multiple vehicles in a fleet to identify vehicle proximate events forming a chain of transfer opportunities that will result in delivery of the files to the destination machine before the transfer time deadline.

11. The process of claim 8 further comprising:
    if the transfer time deadline is approaching or has arrived and updated route schedules indicate the transfer time deadline will be exceeded, transfer the files via satellite.

12. The process of claim 8 further comprising:
upon occurrence of a first proximate event, or at each proximate event in a required event chain to transfer the files to the destination machine, re-traversing the vehicle route schedule to determine if the files will reach the destination machine before the transfer time deadline.

\* \* \* \* \*